United States Patent [19]
Baumgart et al.

[11] Patent Number: 5,567,484
[45] Date of Patent: Oct. 22, 1996

[54] PROCESS FOR TEXTURING BRITTLE NONMETALLIC SURFACES

[75] Inventors: Peter M. Baumgart, San Jose; Wing P. Leung, Arcadia; Hung V. Nguyen; Thao A. Nguyen, both of San Jose; Andrew C. Tam, Saratoga; Anthony Wu, San Jose, all of Calif.

[73] Assignee: International Business Machines Corporation, Armonk, N.Y.

[21] Appl. No.: 455,861

[22] Filed: May 31, 1995

Related U.S. Application Data

[62] Division of Ser. No. 149,851, Nov. 10, 1993, abandoned.

[51] Int. Cl.$^6$ ........................................ B05D 3/00
[52] U.S. Cl. ........................ 427/555; 427/128; 427/596; 427/444
[58] Field of Search ........................ 427/555, 596, 427/444, 128–132

[56] References Cited

U.S. PATENT DOCUMENTS

| | | | |
|---|---|---|---|
| 4,985,306 | 1/1991 | Morizane et al. | 428/410 |
| 5,062,021 | 10/1991 | Ranjan et al. | 360/135 |
| 5,079,657 | 1/1992 | Aronoff et al. | 360/103 |
| 5,108,781 | 4/1992 | Ranjan et al. | 427/53.1 |
| 5,143,578 | 9/1992 | Luthi | 156/643 |
| 5,162,073 | 11/1992 | Aronoff et al. | 156/625 |
| 5,236,763 | 8/1993 | Luthi | 428/156 |

FOREIGN PATENT DOCUMENTS 43-11814  11/1992  Japan ........................ G11B 5/84

*Primary Examiner*—Bernard Pianalto
*Attorney, Agent, or Firm*—Baker, Maxham, Jester & Meador

[57] ABSTRACT

A process for creating an array of bumps to texture a brittle nonmetallic surface, such as a glass substrate for data recording disks. The texturing process uses a laser to provide pulses of proper energy fluence to the brittle glass surface to produce a plurality of raised bumps in the surface. The bump creation is accomplished without unwanted micro-cracking or ejection of surface material by limiting the laser pulse fluence to a value in a narrow operating region discovered below the abrupt thermal shock fluence threshold for the brittle nonmetallic surface material. The process is also applicable to other brittle surface textures, such as those intended for use as "stamping surfaces" for the contact reproduction of the negative of a surface pattern, such as an optical disk.

40 Claims, 4 Drawing Sheets

PROCESS FOR TEXTURING BRITTLE NONMETALLIC SURFACES

CROSS-REFERENCES TO RELATED APPLICATIONS

This application is a division of application No. 08/149,851, filed Nov. 10, 1993, now abandoned.

This application is related by common inventorship and subject matter to co-pending patent application Ser. No. 08/150,525 filed on Nov. 10, 1993, abandoned, entitled "PROCEDURE EMPLOYING A DIODE-PUMPED LASER FOR CONTROLLABLY TEXTURING A DISK SURFACE" which is entirely incorporated herein by reference.

BACKGROUND OF THE INVENTION

1. Field of the Invention

This invention relates generally to processes for texturing data storage disk substrates and specifically to a highly controllable laser texturing process for brittle nonmetallic surfaces such as a glass substrate for a data storage disk.

2. Description of the Related Art

Recent magnetic disk drive designs employ a commonly denominated Contact Start-Stop (CSS) system in which the magnetic head contacts the magnetic disk surface when the disk is stationary. When the disk starts to rotate, the magnetic head slides along the surface, eventually flying fully lifted from the surface because of laminar air flow at the disk surface.

A smooth, specular recording surface is preferred in the art to permit the magnetic head to ride as closely as possible to the disk surface. Creation of a "textured" region on the metallic disk surface for magnetic head contact during CSS is used in the art to overcome the excessive contact stiction and friction developed during startup and stopping of disk rotation. The magnetic head is moved to the "CSS region" at the appropriate times by the drive controller. The specular smoothness of the remainder of the disk surface is retained to permit high-density magnetic data recording.

Practitioners in the art have proposed several useful techniques for texturing metal disk surfaces. For instance, the use of repetitive laser pulses to create reproducible pits on a metal surface is known in the art for application to sheet-metal stamping surfaces, liquid transfer surfaces and metal data storage disk surfaces, as discussed in the above-cited co-pending patent application. Unfortunately, such techniques are not generally useful for texturing of brittle nonmetallic disk substrate surfaces such as the glass substrate known in the art for certain data storage disk applications. A brittle nonmetallic surface, especially a glass surface, is expected to crack or deform excessively during the grinding or laser texturing techniques known in the art for metal disk substrates. Accordingly, chemical surface texturing techniques and other patterned deposition techniques are preferred in the art for brittle surfaces such as ferrite or glass.

For instance, in U.S. Pat. Nos. 5,079,657 and 5,162,073, Michael I. Aronoff et al. disclose a selective chemical etching technique for texturing the flying surface of a magnetic head. Aronoff et al. teach a stiction-reducing approach that avoids the necessity of texturing a CSS region on the recording disk but is disadvantageously limited to specific head surface materials.

In U.S. Pat. No. 4,985,301, Toshinori Morizane et al. disclose a method for manufacturing a glass base plate for a recording disk that includes subjecting the base plate to chemical etching treatments that provide different rates of etching between a crystallized material and an amorphous material. Morizane et al. teach the use of their method for creating a textured CSS region in the base plate that is reproduced through a subsequently-deposited recording material layer. Other practitioners have suggested using expensive chemical vapor deposition (CVD) processes to create roughened zones on a glass disk surface before deposition of the magnetic recording film layer.

Some practitioners in the printing arts teach the use of laser pulses to create many tiny pits in the surface of a brittle material such as tungsten carbide. For instance, in U.S. Pat. Nos. 5,143,578 and 5,236,763, Pierre Luthi discloses a method for engraving a series of consecutive cells or pits in a solid surface such as the liquid transfer surface of a printing roller. Luthi recommends his technique to overcome the surface hardness of the ceramic and metal carbide surfaces normally used in engraving applications but neither considers nor suggests solutions to the particular problems of CSS region creation in brittle nonmetallic disk surfaces to overcome head stiction.

Others have considered the specific problem of using laser energy for reducing stiction in data recording disks having glass substrates. For instance, in Japanese patent 4-311814, Maeta Hiroshi discloses a technique for texturing the glass substrate without reducing surface durability by applying a laser pulse from the back of the translucent substrate to fracture and scatter small particles of glass at the front surface. The laser pulse induces thermal shock that effectively breaks up the front surface into fine grains that are then supposedly partially annealed to the front surface, creating a roughened topography suitable for reducing stiction in the magnetic recording film layer that is later added to the front glass substrate surface. Hiroshi doesn't discuss how his method overcomes the problems resulting from uncontrolled surface damage.

In U.S. Pat. Nos. 5,062,021 and 5,108,781, Rajiv Ranjan et al. disclose a process for creating a series of closely-spaced pits in the metallic surface of a magnetic recording disk to reduce stiction. Ranjan et al. teach the use of a flashlamp-pumped neodymium-yttrium-aluminum-garnet (Nd:YAG) laser to create the necessary surface roughness. However, they neither consider nor suggest the application of their texturing method to glass disk substrates or other brittle nonmetallic surfaces, and indeed their method is generally known to be impractical for brittle nonmetallic materials.

Practitioners in the art generally avoid using laser pulses to create controlled changes to the topography of a brittle nonmetallic surface, expecting hair-line cracking or surface material damage. This damage, often at the microscopic level, is frequently observed after laser melting of any brittle nonmetallic material such as glass because of the rapid melting and resolidification caused by a short laser pulse. This rapid melting and resolidification usually causes excessive stress in the glass, which forces the surface to crack and break up. Such laser pulses are herein said to create stress that exceeds a "thermal shock threshold" for the brittle nonmetallic surface material. Indeed, the above-cited Hiroshi patent relies on this thermal shock micro-fracturing phenomenon for the usefulness of the claimed invention. Laser pulse energies below this threshold are generally believed to be useless for altering the topography of brittle nonmetallic surfaces.

Accordingly, there is a clearly-felt need in the art for a brittle nonmetallic surface texturing technique with the controllability and other advantages of the laser-texturing techniques known in the art for metal surfaces. The related unresolved problems and deficiencies are clearly felt in the art and are solved by this invention in the manner described below.

SUMMARY OF THE INVENTION

This invention solves the above problem by exploiting the unexpected discovery that high-reproducible bumps can be controllably made on a glass disk surface using single laser pulses of precisely-controlled energy fluence. Fluence control is required to exploit an unexpected comparatively narrow operating region just under the abrupt thermal-shock fluenee threshold for the brittle nonmetallic material. Fluence control is accomplished using selected combinations of laser wavelength, pulsewidth and repetition rate combined with proper bump spacing to avoid overstressing of the laser irradiated region. The narrow operating fluence region of this invention is bounded above by the thermal shock threshold and below by the melting or softening point of the material.

It is an object of this invention to create many microscopic bumps in a desired CSS region of a glass, ceramic or other brittle nonmetallic substrate surface to improve stiction, wear, friction, or coatability of such surfaces or to prepare the surface as a "stamping surface" mold for reproducing a negative impression. It is an advantage of the method of this invention that highly-reproducible microscopic bumps can be controllably created on a selected region of a surface using a pulsed laser.

It is another object of the method of this invention to avoid damage to the brittle nonmetallic surface caused by micro-cracking because of laser pulse heating. It is a feature and advantage of the method of this invention that laser pulse fluence is tightly controlled within a proper region just under the thermal-shock fluence threshold at which occurs such hair-line cracking of the glass surface and material ejection. This feature arises from the completely unexpected discovery that there is an abrupt transitional energy fluence threshold (the "thermal shock threshold") below which the laser pulse energy fluenee either has no effect or merely creates a bump without damage. For a glass disk with compressive surface stress, such a bump unexpectedly protrudes almost entirely above the nominal surface, which is remarkably useful for reducing stiction in data storage disks.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DESCRIPTION OF THE PREFERRED EMBODIMENTS

Figure 1:
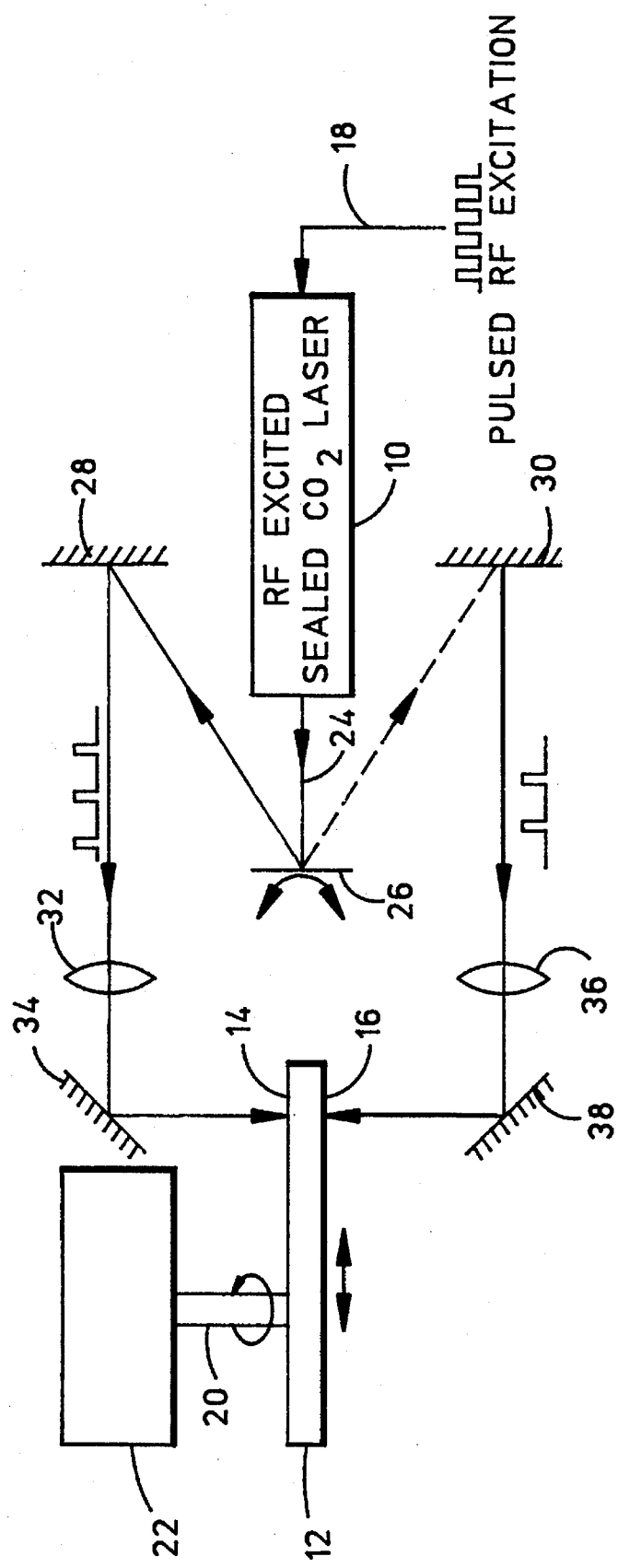
FIG. 1 is a functional schematic diagram of an exemplary apparatus for texturing a glass or other brittle nonmetallic surface in accordance with the method of this invention.

The process of this invention arises from the unexpected discovery that highly-reproducible, microscopic bumps can be controllably, inexpensively and quickly made on a glass disk surface using single laser pulses of the proper wavelength, pulsewidth and repetition rate combined with proper movement of the disk surface. FIG. 1 shows a functional schematic diagram of an exemplary apparatus suitable for implementing the process of this invention. This disclosure is primarily concerned with the texturing of glass storage disk substrates for reduced stiction, although the apparatus of FIG. 1 may be employed for creating a desired patterned area on glass, ceramic or other brittle nonmetallic substrate surfaces for purposes of reduced stiction, improved wear or improved coatability,, or as a "stamping surface" for use in mass production of other surfaces imprinted with the negative of the stamping pattern. Thus, the process of this invention can be appreciated as having general applicability even though this disclosure is concerned with the texturing of glass disks for dam-storage.

In FIG. 1, a pulsed laser 10 is chosen so that the optical penetration of the radiation incident on the glass disk substrate 12 is longer than 10 nanometers and shorter than one millimeter to produce effective "near-surface" heating of the glass substrate. The pulsewidth is chosen to be longer than one nanosecond and shorter than 100 milliseconds to provide efficient heating of the interaction volume without causing excessive thermal shock (below one nanosecond) or excessive volumetric heating through thermal-diffusion (above 100 milliseconds). The laser peak power and the focussed spot size on the two surfaces 14 and 16 of glass disk 12 are chosen for an "energy density" or "fluence" sufficient to provide gentle surface softening or melting over a short time period without causing the shattering and material ejection from surfaces 14–16 expected at higher fluence values.

Laser 10 is controlled by a pulsed radio-frequency (rf) excitation signal 18 to provide a pulse repetition rate that, when combined with proper translation and rotational movement of glass substrate 12, provides single laser-pulse action in a new target area on surfaces 14–16 each time the laser fires. This requirement is necessary to the process of this invention because it provides a wider operating range of fluences below the "thermal shock threshold" at which surface cracking and material ejection occurs. Although this "spaced-apart" target area requirement is preferred, the process of this invention may also be used for overlapping irradiation target spots but with a narrower acceptable operating range of fluences below the thermal-shock fluence threshold.

The operation of the apparatus in FIG. 1 is now described. Disk substrate 12 is rotated on a shaft 20 by means of a motor 22 and the entire motor-shaft assembly is translated radially by some useful translation means (not shown). In synchronism with disk rotation and translation, laser 10 is pulsed by signal 18 to provide the output pulses 24. Output pulses 24 can be split by deflection with a movable mirror 26 to either an upper stationary mirror 28 or a lower stationary mirror 30. Pulses 24 travelling along the upper path bounce off mirror 28 through a ZnSe focussing lens 32 to a stationary mirror 34 and therefrom to upper surface 14 of glass substrate disk 12. Similarly, pulses 24 along the lower path bounce off mirror 30 through the ZnSe focussing lens 36 to mirror 38 and therefrom to lower surface 16 of disk 12. Thus, with proper mechanical control of mirror 26, both sides 14 and 16 may be textured simultaneously.

In FIG. 1, the texturing at surfaces 14–16 is controlled by the combination of pulse energy, spot size, pulse rate, pulse width, disk rotation rate and disk translation rate. In addition to these control elements, the laser wavelength is selected to obtain the near-surface heating effect discussed above. It is an essential element of the process of this invention that the energy fluence at surfaces 14–16 is precisely controlled in a manner exemplified by the above discussion in connection with FIG. 1. This requirement is important because of the unexpected discovery that there exists a rather abrupt energy fluence "thermal-shock threshold level" for many brittle nonmetallic surfaces including glass. Above this threshold, the glass surface is at least partially shattered and material can be ejected. In much of the energy fluence region below the thermal-shock fluence threshold, energies are insufficient to create any topographical alteration to the brittle nonmetallic surface. The process of this invention exploits the heretofore unknown and relatively narrow fluence region properly below the thermal-shock threshold to create useful surface textures in brittle nonmetallic materials.

Figure 2A:
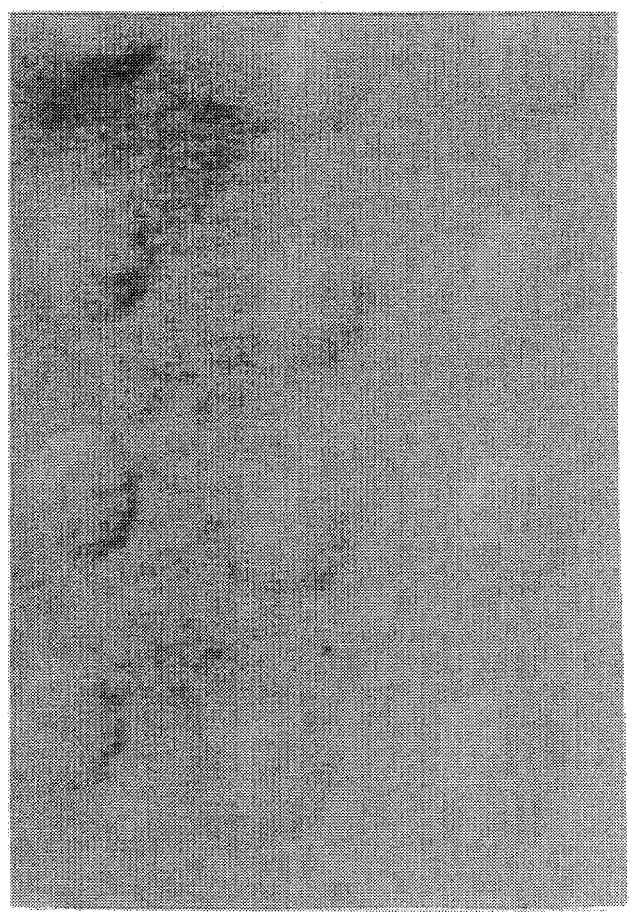
FIGS. 2A, 2B and 2C show a typical surface bump array and bump profile obtained using the method of this invention.
Figure 2C:
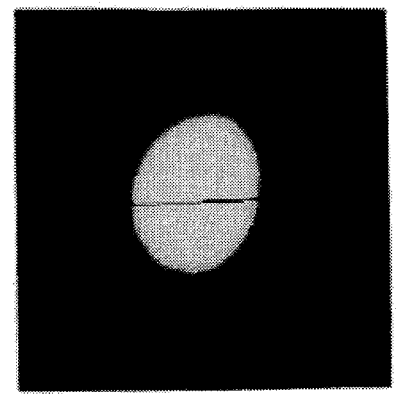
Figure 2B:
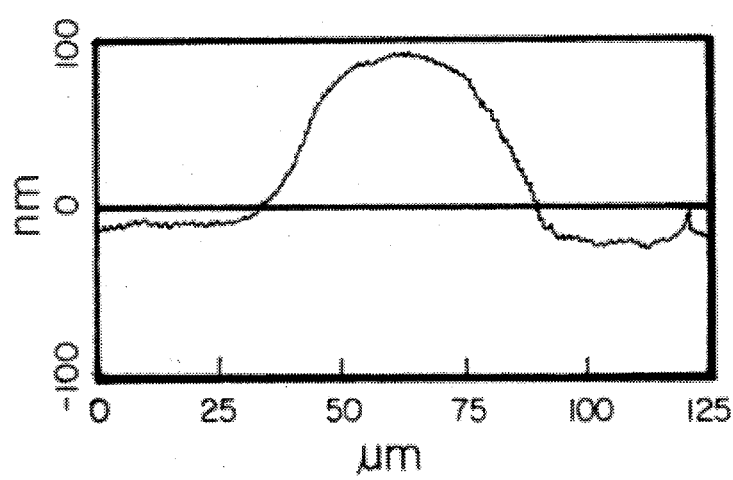

FIG. 2A shows the texture on a glass surface resulting from an exemplary combination of process parameters employed by the inventors to create a CSS zone on a glass recording disk substrate. The plurality of bumps in FIG. 2A characterizes the texture of this invention, showing each bump separated from its neighboring bump by a desired separation distance $D_s$. FIG. 2B shows the Atomic Force Microscope (AFM) profile measured along the path crossing the single bump shown in FIG. 2C. The profile in FIG. 2B is seen to have a maximum diametral dimension $D_d$ of substantially (90 minus 30)=60 micrometers and a maximum height $h_d$ of substantially 100 nanometers above the surrounding substrate surface plane. The bumps are very smooth and ideally suited for reducing stiction in a CSS region of a data storage disk. Even with a protruding height $h_d$ of 100 nanometers for the bumps, no cracks or shattering is observed on the glass surface. Lower bump height, i.e. on the order of $h_d$=[3, 40] nanometers, can be more desirable for CSS region texturing. These shorter bumps can be created by using lower laser fluences than those necessary for the 100 nanometer bumps. No cracking or shattering is produced during creation of such shorter bumps, either.

The following process parameters are herein disclosed as an example of an acceptable operating window providing energy fluence below the thermal-shock threshold for a glass surface:

laser wavelength, $\lambda_p$=10.6 micrometers;
laser pulse width, $t_p$=60 microseconds;
laser pulse peak power, $P_p$=12 watts;
focussed target spot diameter, $D_p$=200 micrometers;
pulse repetition rate, $F_p$=1500 Hertz;
disk rotational speed, $\omega$=4$\pi$ radians/second;
disk translational speed, $v_r$=200 micrometers/second; and
nominal radial bump spacing, $r_s$=100 micrometers.

It should be appreciated that although the target area spot size $D_p$ is 200 micrometers, the bump size $D_d$ is only 30 micrometers. This relationship illustrates the "threshold" characteristics of the laser texturing process of this invention that create a feature size much smaller than the radiated spot size. Without supporting evidence, the inventors hypothesize that the unexpected "fully-protruded" dimpling effect may result from a relaxation of surface stress caused by the laser-induced surface softening or by the laser-induced thermal expansion that "freezes-in" as the surface cools below the softening point.

Bumps of height $h_d$ from a few nanometers to as large as many micrometers can be produced by this technique of this invention. The inventors have demonstrated that larger bump heights can be produced through repetitive pulsing of the same target region spot without producing cracks, provided that the thermal shock threshold fluence level is not exceeded by any one pulse.

Figure 3A:
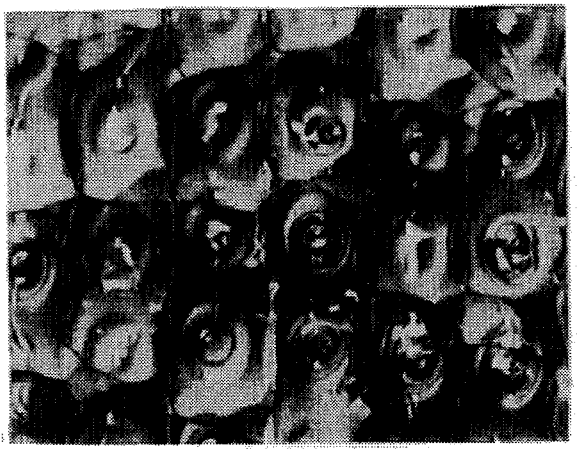
FIGS. 3A, 3B, 3C and 3D show the surface texture of a glass substrate created in accordance with the method of this invention for four different fluence levels, two of which cause micro-cracking of the surface.
Figure 3C:
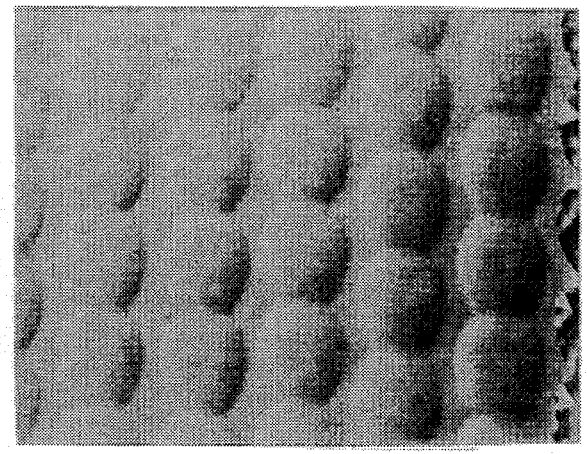
Figure 3B:
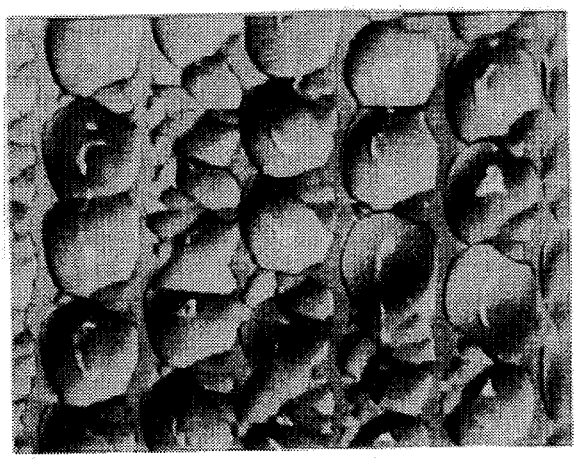

FIGS. 3A and 3B illustrate the effects of exceeding the thermal-shock fluence threshold in a glass surface and also demonstrate the abrupt upper limit of the acceptable fluence operating region. Each of the surfaces in FIGS. 3A, 3B, 3C and 3D were produced using the same operating parameters as are discussed above in connection with FIG. 2A, except for repetition rate ($F_p$=2,000 Hz instead of 1,500 Hz) and for pulse width $t_p$. Bump spacing in FIGS. 3A–3D is less than in FIG. 2A because of the increased repetition rate $F_p$.

Figure 3D:
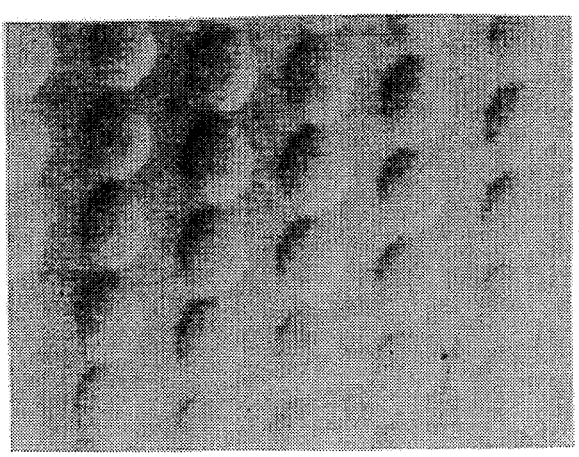

FIG. 3D shows the surface texture resulting from a pulse width $t_p$=60 microseconds. FIG. 3C shows the surface texture produced by a 33% increase in $t_p$ to 80 microseconds. The surface in FIG. 3C remains free of visible microcracks and debris. However, FIG. 3B shows extensive evidence of the micro-cracking that results with only an additional 12.5% increase in pulse width $t_p$ to 90 microseconds. It is this unexpectedly abrupt thermal-shock fluence threshold characteristic of brittle nonmetallic surfaces that motivated the refined fluence control element of the texturing process described herein. Finally, FIG. 3A shows the extensive surface damage and material ejection known in the art for laser-textured brittle nonmetallic surfaces. FIG. 3A is created by a pulse width $t_p$=150 microseconds, which is 250% of the value used for FIG. 3D.

Figure 4:
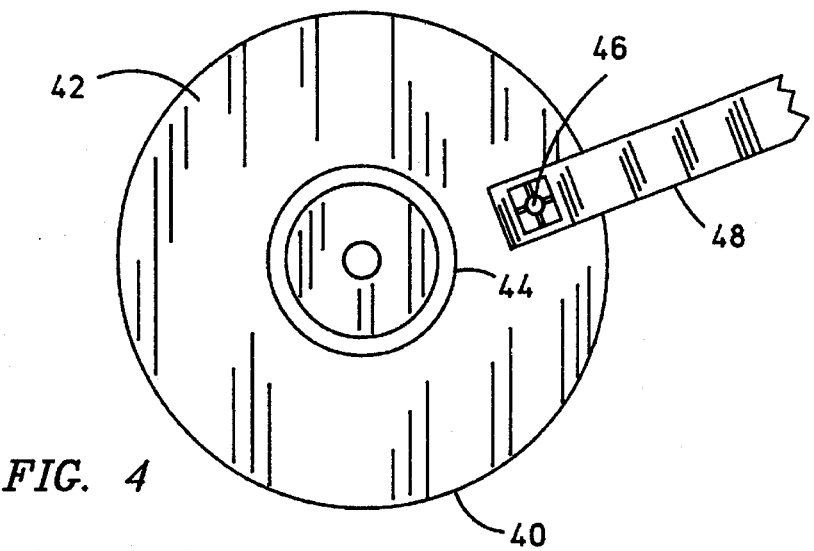
FIG. 4 is a plan view of a rotatable magnetic recording disk and magnetic head, including a Contact Start-Stop (CSS) region for contact between the magnetic head and recording disk.
Figure 5:
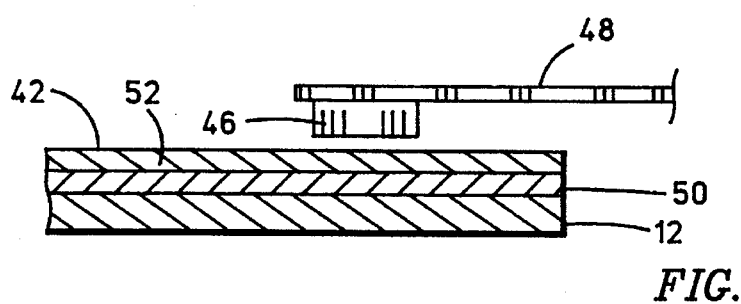
FIG. 5 is an enlarged sectional view of the magnetic disk of FIG. 4.

FIGS. 4 and 5 show a magnetic storage disk 40 having a specular outer surface 42 and a textured annular region 44 for use in Contact Start-Stop (CSS) cycling of the magnetic head 46. Magnetic head 46 is mounted on an arm 48, which is connected to means (not shown) for positioning head 46 in a generally radial direction with respect to rotating disk 40. In particular, head 46 is positioned over textured annular region 44 whenever the rotation of disk 40 is started or stopped.

Specular outer surface 42 of disk 40 (FIG. 5) may cover several layers of intervening materials. For instance, a glass substrate 12 may be formed and textured in accordance with the process of this invention before deposition of the subsequent magnetic recording layer 50 and protective layer 52. The topographical features of the textured surface of glass substrate 12 are reproduced at the surface of each subsequent layer deposited, thereby providing the desired texture in CSS region 44 on outer surface 42. Alternatively, any of the layers above glass substrate 12 may first be deposited and then textured in accordance with the method of this invention or any other useful method known in the art. Thus, "outer surface" 26 is used herein to denominate the surface of whichever of layers 12, 50 or 52 is modified topographically in accordance with the process of this invention. Ultimately, for data storage disk applications, the surface of protective layer 52 exhibits the desired texture in the CSS region provided by textured annular region 44.

Figure 6:
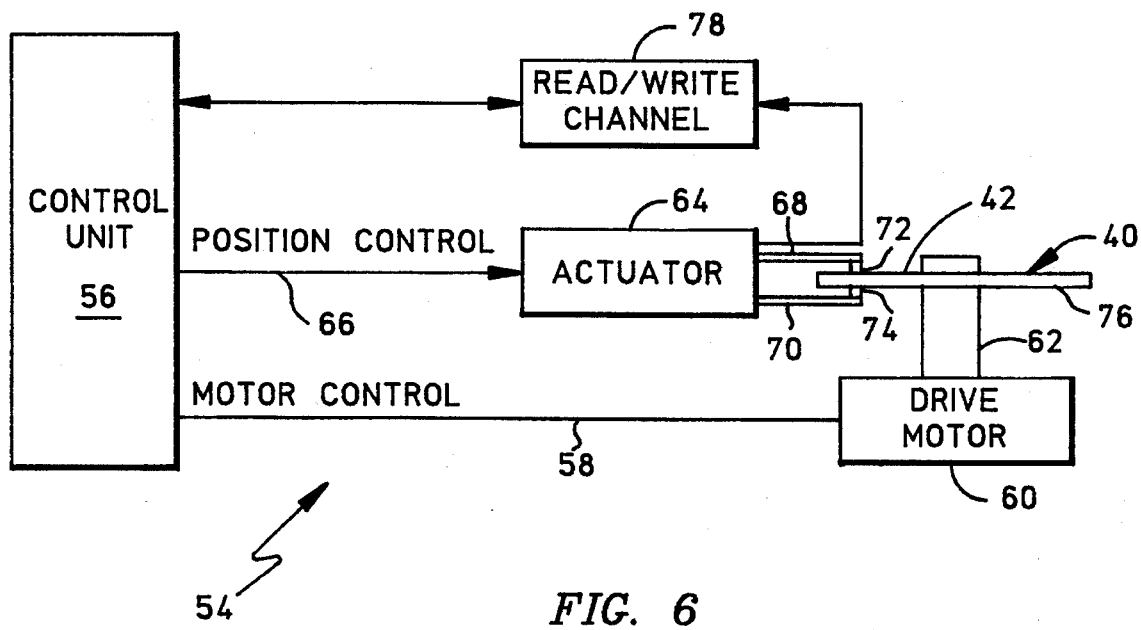
FIG. 6 is a functional block diagram of a Direct Access Storage Device (DASD) employing an embodiment of the textured recording disk of this invention.

FIG. 6 shows a functional block diagram of a Direct Access Storage Device (DASD) 54 employing the textured disk 40 having the glass substrate 12 of this invention. DASD 54 includes a control unit 56, which coordinates the operation of all elements with rotating disk 40. Control unit 56 provides a motor control signal 58 to a drive motor 60, which rotates disk 40 through a shaft 62. Control unit 56 also operates a head actuator 64 through a position control line 66. Actuator 64 is mechanically coupled through the two flexible members 68 and 70 to the two magnetic heads 72 and 74, respectively. Magnetic head 72 is disposed to read and write data on upper surface 42 of disk 40 and head 74 is similarly disposed to read and write data on the lower surface 76 of rotating disk 40. Heads 72 and 74 are coupled through a read/write channel 78 to control unit 56, whereby digital data is transferred to and from rotating disk 40.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A method for texturing a surface comprising the steps of:
   providing an element which is composed essentially of a glass material which has a thermal shock threshold fluence level above which said glass material is fractured, the element having a surface;
   concentrating pulses of laser energy selectively on a plurality of spaced-apart locations over a treatment area of said surface to alter the topography of said surface in a target area at each said spaced-apart location, each pulse of laser energy having a fluence $f_p$ at said each spaced-apart location wherein the fluence $f_p$ is less than said thermal shock threshold fluence level for said glass material;
   each pulse of laser energy having laser energy $E_p$ a duration $t_p$ and a focussed spot having a maximum spot diametral dimension $D_p$, wherein $E_p$, $t_p$ and $D_p$ are selected to limit said fluence $f_p$ to a value below said thermal shock threshold fluence level, whereby a bump is formed in said each target area, said each bump having a maximum bump diametral dimension $D_d$ and rising to a maximum height $h_d$ above said surface; and
   said duration $t_p$ being in the interval $10^{-9}$ to $10^{-1}$ seconds, said maximum spot diametral dimension $D_p > D_d$ being in the interval 1 to 500 micrometers and said pulse of laser energy having a wavelength $\lambda_p$ such that the optical penetration of said pulse of laser energy in said surface is in the interval $10^{-8}$ to $10^{-3}$ meters.

2. The method of claim 1 wherein said maximum bump height $h_d$ is in the interval 1 to 1000 nanometers.

3. The method of claim 1 wherein said surface strongly absorbs laser energy in a first spectral region and said wavelength $\lambda_p$ is in said first spectral region and said pulses of laser energy are generated by a carbon dioxide ($CO_2$) laser.

4. The method of claim 1 wherein each said spaced-apart location is separated from the nearest neighboring said spaced-apart location by a spacing distance $D_s \geq D_d$.

5. The method of claim 1 wherein each said spaced-apart location is separated from the nearest neighboring said spaced-apart location by a spacing distance $D_s$ substantially less than said maximum diametral dimension $D_d$, whereby a plurality of said bumps merge with their neighboring bumps to form a substantially continuous ridge on said surface.

6. The method of claim 1 including the step of depositing on said surface a film of magnetic data recording material.

7. A method for texturing a substrate composed essentially of a glass material comprising the steps of:
   providing a substrate composed essentially of a glass material which has a thermal shock threshold fluence level above which said glass material is fractured, the substrate having a substrate surface;
   concentrating pulses of laser energy selectively on a plurality of spaced-apart locations over a treatment area of said substrate surface to alter the topography of said substrate surface in a target area at each said spaced-apart location, each pulse of laser energy having a fluence $f_p$ at said each spaced-apart location, wherein the fluence $f_p$ is less than said thermal shock threshold fluence level for said glass material; and
   each pulse of laser energy having energy $E_p$ a duration $t_p$ and a focussed spot having a maximum spot diametral dimension $D_p$, wherein $E_p$, $t_p$ and $D_p$ are selected to limit said fluence $f_p$ to a value below said thermal shock threshold fluence level whereby a bump is formed in said each target area, said each bump having a maximum bump diametral dimension $D_d$ and rising to a maximum height $h_d$ above said substrate surface.

8. A method as claimed in claim 7 wherein said substrate is composed essentially of a glass base covered with a film of magnetic data recording material.

9. A method as claimed in claim 7 wherein said duration $t_p$ is in the interval $10^{-9}$ to $10^{-1}$ seconds and said maximum spot diametral dimension $D_p > D_d$ is in the interval 1 to 500 micrometers.

10. A method as claimed in claim 9 wherein said pulse of laser energy has a wavelength $\lambda_p$ such that the optical penetration of said pulse of laser energy in said glass material is in the interval $[10^{-8}, 10^{-3}]$ meters.

11. A method as claimed in claim 10 wherein said substrate is composed essentially of a glass base covered with a film of magnetic data recording material.

12. A method as claimed in claim 7 wherein said maximum bump height $h_d$ is in the interval [1, 1000] nanometers.

13. A method as claimed in claim 7 wherein said pulse of laser energy has a wavelenth $\lambda_p$ such that the optical penetration of said pulse of laser energy in said glass material is in the interval $[10^{-8}, 10^{-3}]$ meters.

14. A method as claimed in claim 13 wherein said glass material strongly absorbs laser energy in a first spectral region and said wavelength $\lambda_p$ is in said first spectral region.

15. A method as claimed in claim 14 wherein said substrate is composed essentially of a glass base covered with a film of magnetic data recording material.

16. A method as claimed in claim 15 wherein said duration $t_p$ is in the interval $10^{-9}$ to $10^{-1}$ seconds and said maximum spot diametral dimension $D_p > D_d$ is in the interval 1 to 500 micrometers.

17. A method as claimed in claim 16 wherein each said spaced-apart location is separated from the nearest neighboring said spaced-apart location by a spacing distance $D_s \geq D_d$.

18. A method as claimed in claim 17 wherein said substrate is composed essentially of a glass base covered with a film of magnetic data recording material.

19. A method as claimed in claim 16 wherein each said spaced-apart location is separated from the nearest neighboring said spaced-apart location by a spacing distance $D_s$ substantially less than said maximum bump diametral dimension $D_d$, whereby a plurality of said bumps merge with their neighboring bumps to form a substantially continuous ridge on said substrate surface.

20. A method as claimed in claim 19 wherein said substrate is composed essentially of a glass base covered with a film of magnetic data recording material.

21. A method of texturing a surface of an element comprising the steps of:

providing a non-metallic brittle element which has a surface, the surface having a nominal surface plane;

directing a plurality of laser pulses at a plurality of locations on the surface of the element, each laser pulse having a fluence $f_p$ and a duration $t_p$ at a respective location on the surface of the element;

the element having a threshold thermal fluence level at each location above which the element shatters and/or results in material ejection; and each laser pulse having a fluence $f_p$ and duration $t_p$ which is selected to produce a bump of diameter $D_d$ and a height $h_d$ above said nominal surface plane at each respective location without exceeding said threshold thermal fluence level of the element at said location.

22. A method of texturing as claimed in claim 21 wherein:

a plurality of bumps are formed having substantially the same height, $h_d$; and each bump is a smoothly shaped dome free of surface cracks and material ejection.

23. A method of texturing as claimed in claim 22 wherein: the height $h_d$ of each bump is from 1 to 1,000 nanometers; and the diameter $D_d$ of the bump is from 1 to 200 micrometers.

24. A method of texturing as claimed in claim 23 wherein each said spaced apart location is separated from a nearest neighboring spaced part location by a center to center spacing distance $D_s \geq D_d$ which is from 1 to 500 micrometers.

25. A method of texturing as claimed in claim 24 wherein the duration $t_p$ is from $10^{-9}$ to $10^{-1}$ seconds and the laser pulse has a spot size $D_p$ at each respective location which is from 1 to 500 micrometers.

26. A method of texturing as claimed in claim 25 wherein the element is composed essentially of glass.

27. A method of texturing as claimed in claim 21 wherein:

a plurality of laser pulses are directed at each of at least some of the locations for increasing the height of each bump at said each of at least some of the locations; and said plurality of laser pulses have a pulse repetition rate $F_p$ which is selected so that said threshold thermal fluence level is not exceeded at said each of at least some of the locations.

28. A method of texturing as claimed in claim 21 wherein the element is composed essentially of glass.

29. A method of texturing as claimed in claim 28 wherein:

a plurality of laser pulses are directed at each of at least some of the locations for increasing the height of each bump at said each of at least some of the locations; and said plurality of laser pulses have a pulse repetition rate $F_p$ which is selected so that said threshold thermal fluence level is not exceeded at said each of at least some of the locations.

30. A method of texturing as claimed in claim 28 wherein:

a plurality of bumps are formed having substantially the same height $h_d$; and each bump is a smoothly shaped dome free of surface cracks and material ejection.

31. A method of texturing as claimed in claim 30 wherein the element strongly absorbs laser energy in a first spectral region and the laser pulse has a wavelength $\lambda_p$ which is in said first spectral region.

32. A method of texturing as claimed in claim 31 wherein said laser pulse has a wavelength $\lambda_p$ which causes penetration of the laser pulse into the element at each location on the surface from $10^{-8}$ to $10^{-3}$ meters.

33. A method of texturing as claimed in claim 32 wherein each laser pulse causes near surface heating which melts the element at each respective location.

34. A method of texturing as claimed in claim 30 wherein:

the height $h_d$ of each bump is from 1 to 1,000 nanometers; and the diameter $D_d$ of each bump is from 1 to 200 micrometers.

35. A method of texturing as claimed in claim 34 wherein the duration $t_p$ is from $10^{-9}$ to $10^{-1}$ seconds and the laser pulse has a spot size $D_p$ at each respective location which is from 1 to 500 micrometers.

36. A method of texturing as claimed in claim 35 wherein:

a plurality of laser pulses are directed at each of at least some of the locations for increasing the height of each bump at said each of at least some of the locations; and said plurality of laser pulses have a pulse repetition rate $F_p$ which is selected so that said threshold thermal fluence level is not exceeded at said each of at least some of the locations.

37. A method of texturing as claimed in claim 35 wherein the element strongly absorbs laser energy in a first spectral region and the laser pulse has a wavelength $\lambda_p$ which is in said first spectral region.

38. A method of texturing as claimed in claim 37 wherein said laser pulse has a wavelength $\lambda_p$ which causes penetration of the laser pulse into the element at each location on the surface from $10^{-8}$ to $10^{-3}$ meters.

39. A method of texturing as claimed in claim 38 wherein each laser pulse causes near surface heating which melts the element at each respective location.

40. A method of texturing as claimed in claim 39 wherein:

a plurality of laser pulses are directed at each of at least some of the locations for increasing the height of each bump at said each of at least some of the locations; and said plurality of laser pulses have a pulse repetition rate $F_p$ which is selected so that said threshold thermal fluence level is not exceeded at said each of at least some of the locations.

* * * * *